(12) United States Patent
Thakare

(10) Patent No.: US 8,566,929 B2
(45) Date of Patent: Oct. 22, 2013

(54) INTEGRITY CHECK FAILURE DETECTION AND RECOVERY IN RADIO COMMUNICATIONS SYSTEM

(75) Inventor: Kiran Thakare, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1401 days.

(21) Appl. No.: 12/255,509

(22) Filed: Oct. 21, 2008

(65) Prior Publication Data

US 2009/0181643 A1 Jul. 16, 2009

Related U.S. Application Data

(60) Provisional application No. 61/020,958, filed on Jan. 14, 2008.

(51) Int. Cl.
*H04L 29/06* (2006.01)
(52) U.S. Cl.
USPC .............................................. 726/22; 726/25
(58) Field of Classification Search
USPC ...................................................... 726/22–25
See application file for complete search history.

(56) References Cited

U.S. PATENT DOCUMENTS

| | | | |
|---|---|---|---|
| 2004/0192208 A1* | 9/2004 | Kong et al. | 455/63.1 |
| 2005/0213553 A1* | 9/2005 | Wang | 370/349 |
| 2006/0259968 A1* | 11/2006 | Nakakoji et al. | 726/22 |
| 2007/0002745 A1* | 1/2007 | Ossman et al. | 370/235 |
| 2007/0005972 A1 | 1/2007 | Mizikovsky et al. | |
| 2007/0213853 A1* | 9/2007 | Glanzer et al. | 700/79 |
| 2007/0277073 A1* | 11/2007 | Zegers et al. | 714/748 |
| 2008/0137853 A1* | 6/2008 | Mizikovsky et al. | 380/247 |
| 2008/0250500 A1 | 10/2008 | Olson et al. | |
| 2009/0074046 A1* | 3/2009 | Huang et al. | 375/227 |
| 2009/0313520 A1* | 12/2009 | Chung et al. | 714/751 |
| 2010/0161958 A1* | 6/2010 | Cho et al. | 713/151 |

FOREIGN PATENT DOCUMENTS

| | | |
|---|---|---|
| WO | WO 0139429 A1 | 5/2001 |
| WO | WO 2007111721 A2 | 10/2007 |

OTHER PUBLICATIONS

WiMAX Forum™ Mobile System Profile Release 1.0 Approved Specification (Revision 1.4.0: May 2, 2007).
International Search Report mailed Feb. 12, 2009 in corresponding PCT Application PCT/SE2008/051246.

* cited by examiner

*Primary Examiner* — Edward Zee
*Assistant Examiner* — Chi Nguy
(74) *Attorney, Agent, or Firm* — Nixon & Vanderhye P.C.

(57) ABSTRACT

In a packet-based communication between a mobile radio and a base station in a radio communication system, an authenticity of a packet based on authentication data associated with the packet is tested. Packets that fail the authenticity test are removed from the communication. A security condition is detected when a number of failed packets for the communication exceeds a security threshold, and in response thereto, action is taken to correct or reduce the security condition. The removed packets are preferably not discarded, but instead are stored used for analysis, and based on that analysis, appropriate action can be taken.

35 Claims, 12 Drawing Sheets

ASN: Access Service Network
CSN: Connectivity service network
NSP: Network service provider
NAP: Network access point
GW: Gateway
BS: Base Station
MS: Mobile Station
IMS: IP Multimedia System

INTEGRITY CHECK FAILURE DETECTION AND RECOVERY IN RADIO COMMUNICATIONS SYSTEM

PRIORITY APPLICATION

This application is claims priority from U.S. provisional patent application Ser. No. 61/020,958, filed on Jan. 14, 2008, entitled "Integrity Check Failure Detection & Recovery Measure Mechanism @ Protocol Layer For IEEE 802.16m/16e/21, LTE, UMTS," the contents of which are incorporated herein by reference.

TECHNICAL FIELD

The technical field relates to cellular radio communications, and more particularly, to the integrity of radio communications.

BACKGROUND

In a cellular radio communications system, mobile radio stations communicate with one or more base stations over an air or radio interface. The coverage area of a wireless communication system is typically divided into a number of geographic areas that are often referred to as cells. Mobile radio stations located in each cell may access the wireless communications system by establishing a wireless communication link, often referred to as an air interface, with a base station associated with the cell. The mobile radio stations may include devices such as mobile telephones, personal data assistants, smart phones, Global Positioning System devices, wireless network interface cards, desktop or laptop computers, and the like. Communication between the mobile radio station and the base station may be authenticated and/or secured using one or more security-related protocols.

For example, the WiMAX/IEEE 802.16e standard supports mutual device/user authentication along with other security features like flexible key management protocol, traffic encryption, control and management plane message protection and security protocol optimizations for fast handovers. Privacy and Key Management Protocol Version 2 (PKMv2) is the basis of WiMAX security as defined in IEEE 802.16e. This protocol manages the medium access control (MAC) security. Extensible Authentication Protocol (EAP) authentication, Traffic Encryption Control (TEC), Handover Key Exchange and Multicast/Broadcast security messages all are based on this PKM protocol. Advanced encryption standard (AES)-counter mode encryption (CTR) mode with cipher block chaining-authentication code (CBC-MAC), collectively referred to as AES-CCM, is the cipher used for protecting user data, and keys used for driving the cipher are generated from the EAP authentication. A traffic encryption state (TES) machine that has a periodic traffic encryption key (TEK) refresh mechanism enables a sustained transition of keys to improve protection. Control messages between mobile and base stations are integrity-protected using AES-based cipher-Message Authentication Code (CMAC) or MD5-based Hashed Message Authentication Code (HMAC) schemes. Message authentication codes (MACs), e.g., HMAC/CMAC tuples, are generated using secret keys derived from a secret authentication key (AK). A 3-way handshake scheme is supported by Mobile WiMAX to optimize the re-authentication mechanisms for supporting fast handovers and preventing any man-in-the-middle-attacks.

Authentication, encryption, and other security operations that ensure the integrity of the communications process are typically carried out at the medium access layer. A problem with existing security protocols is that when a packet fails an integrity check, it is simply discarded. Consider the example security protocol in 802.16e. FIG. 1 shows the security sublayer (SS) as specified in 802.16e that sits on the top of the physical PHY layer. It includes traffic data encryption and authentication processing to encrypt or decrypt the traffic data and to execute the authentication function for the traffic data. The message authentication processing element performs control message authentication functions within the control message processing layer and can support HMAC, CMAC, or several short-HMACs. A message authentication code (MAC) is generated for each user data packet by the AES-CCM, and packets found to be not authentic are discarded by the security sublayer. The WiMAX standard does not specify what action should be taken by a mobile station and a base station for the packets that are found to be non-authentic other than just discarding them. A control message contains a control MAC (CMAC) tuple. A control message is not authentic if the length field of the CMAC tuple is incorrect or if a locally-computed value of the digest attribute generated by a digest or encryption algorithm such as MD5 or SHA-1 does not match the digest in the message. "Primary" control messages which are PKM-related (privacy key management), REG (registration)-related, service flow-related (DSx dynamic service allocation/deletion/change) and secondary message TFTP (Trivial File Transfer Protocol)-related are rejected with an authentication failure indication and discarded. The standard does not specify what action should be taken for all other control/management message packets other than discarding them.

There is a need to improve security by authenticating more than just some control messages. For example, basic control messages such as handover indication, handover request, measurement reporting, scanning request, etc. need to be integrity-protected. It would also be desirable to do more than simply discard non-authentic control and data packets. Also, any security breach in the control plane or in the data plane should be detected and addressed. There is also a need to analyze failed packets to determine the reason(s) for and the extent of any security problems, and based on that analysis, to take appropriate action.

Security relates to the integrity of a communication. The integrity of that communication is also affected by other external factors like radio conditions. Accordingly, many wireless communications systems provide error detection and correction mechanisms may also be used on various radio protocol layers such as automatic repeat request (ARQ), hybrid ARQ (HARQ), forward error detection and/or correction, etc. to maintain a certain level of integrity in the communication. But these error correction mechanisms are often optional, which is the case in IEEE 802.16e WiMAX systems. For example, an HARQ scheme is an optional part of the medium access control (MAC) layer, and HARQ may be only supported for the OFDMA physical layer. Today in the WiMAX standard, there is no means to determine whether the data/control packet failed the authenticity check due to radio link conditions or due to a genuine security breach. If error detection and correction mechanisms are implemented then packet integrity checks will probably not fail as a result of poor radio link quality. But if these error detection and correction mechanisms are not used because they are optional, then there is a high probability that packet integrity checks will fail as a result of poor radio link quality and discarded. But rather than simply discarding packets that have failed authentication checking because of poor radio conditions and the lack of error detection and correction mechanisms, it would be better to retransmit those failed packets.

SUMMARY

In a packet-based communication between a mobile radio and a base station in a radio communication system, an authenticity of a packet based on authentication data associated with the packet is tested. Packets that fail the authenticity test are removed from the communication. A security condition is detected when a number of failed packets for the communication exceeds a security threshold, and in response thereto, action is taken to correct or reduce the security condition. The removed packets are preferably not discarded, but instead are stored used for analysis, and based on that analysis, appropriate action can be taken. Preferably, the removed packets are sent to a communications network managing entity which stores the removed packets, analyzes the stored packets, determines whether a security breach exists based on the analysis, and preferably, sets or adjusts appropriate thresholds.

In one non-limiting embodiment, the action may include requesting retransmission of one or more failed packets. For example, an existing ARQ mechanism may be used to request retransmission of one or more packets that failed the authenticity test. If the communications system is based on an IEEE 802.16 standard, an alternative example implementation is to locate an ARQ mechanism at a security sub-layer within the 802.16 communications protocol stack to request retransmission of one or more packets that failed the authenticity test. Another example implementation in this context is to use an ARQ mechanism located at a lower medium access control (MAC)-common part sublayer (CPS) to request retransmission of one or more packets that failed the authenticity test. Another example alternative is to use an ARQ mechanism located at a convergence sublayer (CS) to request retransmission of one or more data packets that failed the authenticity test. Other example actions may include requesting a new encryption key, terminating the communication, or modifying the security threshold. Also useful is to include an indicator in a message associated with the action taken to indicate that action taken is due to occurrence of the security condition.

In a non-limiting example embodiment, multiple authentication-related thresholds may be set for a communication. A corresponding count value is then established for each authentication-related threshold for the communication. One or more of the count values is incremented when a packet fails the authenticity test. A security condition is detected when multiple count values exceed their corresponding authentication-related thresholds. If the communications system is based on an IEEE 802.16 standard and is assigned one or more traffic encryption keys (TEKs), the authentication data is an integrity check value (ICV) appended to the packet. The multiple authentication-related thresholds may then include, for example, an ICV threshold, a packet retransmission threshold related to requesting retransmission of one or more failed packets, and a new traffic encryption key (TEK) threshold related to requesting one or more new TEKs for the communication.

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), using one or more digital signal processors (DSPs), and/or one or more FPGAs (Field Programmable Gate Arrays).

Figure 1:
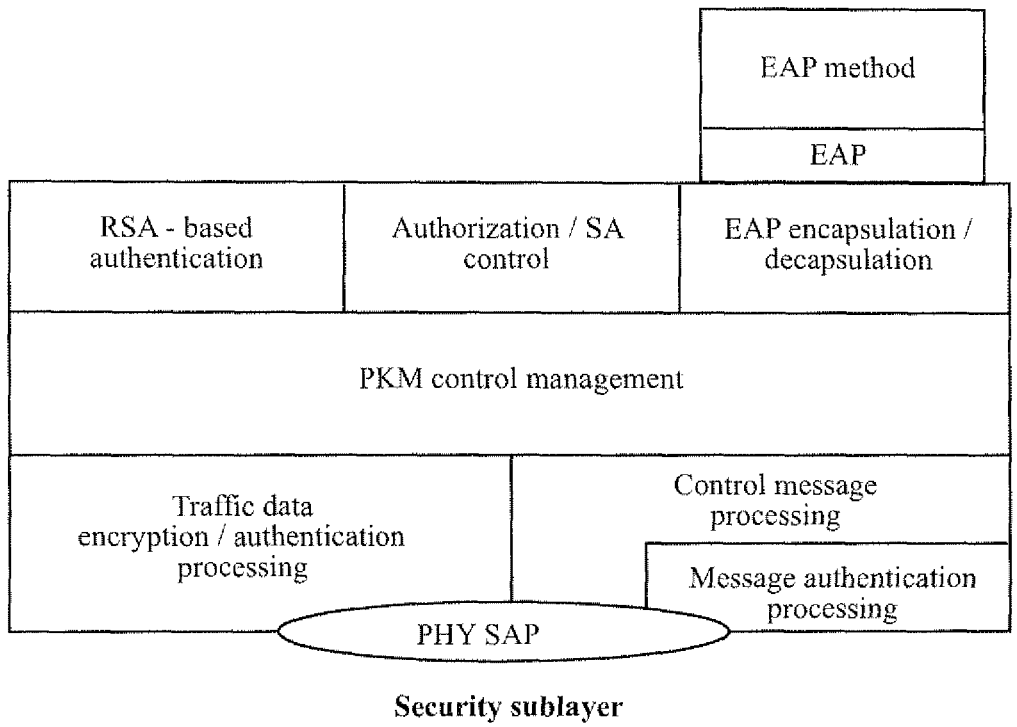
FIG. 1 is diagram illustrating the security sublayer in the 802.16e protocol stack.
Figure 2:
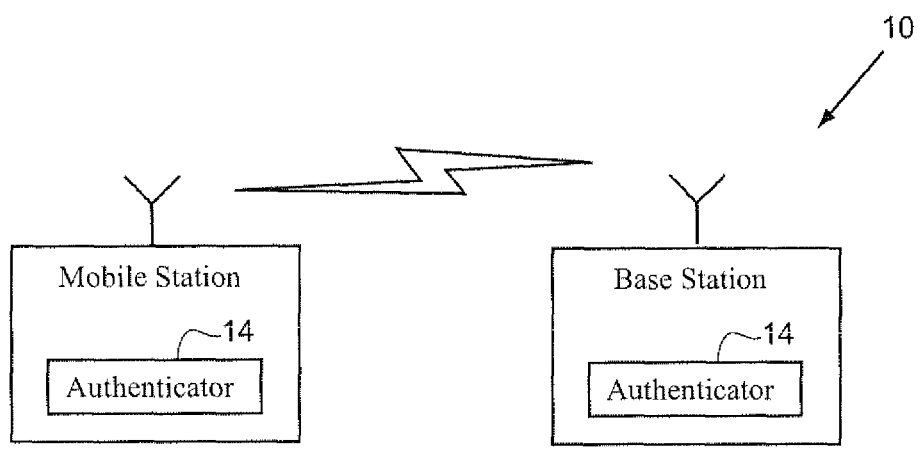
FIG. 2 illustrates an example of a cellular communications system with authentication.

The technology may be used in any type of cellular communications. FIG. 2 illustrates an example of a cellular communications system 10. For ease of description, the term mobile radio or mobile station is used and encompasses any kind of radio communications terminal/device like user equipment (UE), subscriber stations (SSs), PDAs, cell phones, laptops, smart devices, etc. In the cellular communication 10, there are multiple cell areas which are associated with radio base stations (BSs) 12. Collectively, the cells form an access network that provides services to mobile station (MSs) 18. The cells may be associated with one or more network operators. The base stations include or communicate with a security entity 14 that includes an authenticator. The security entity 14 may communicate with other entities or nodes 16 such as an Authorization Authentication Association (AAA) server.

Figure 3:
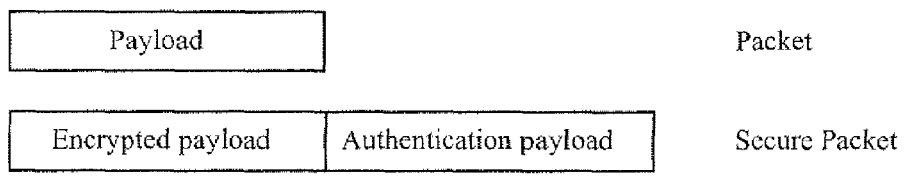
FIG. 3 is a diagram showing a packet before and after security processing.

FIG. 3 is a diagram showing a packet before and after security processing. The initial packet has a payload of data. The payload data may be encrypted for confidentiality reasons (e.g., protect privacy, defend against theft of service, etc.), an authentication data may be appended to the encrypted payload to generate a secure packet. There are a variety of types of information that may be used as authentication data, and some examples are described later in the application. In general, the authentication data is used to check the authenticity or integrity of a packet. The authenticity of a packet relates to its integrity or trustworthiness, and typically, relates to some aspect of security of the communication. Authenticity is distinct from but inclusive of error checking and correction. For example, an authentic packet might not have any bit errors but still might not be authentic because it is not sent form a trusted source. The term authenticity encompasses integrity.

Figure 4:
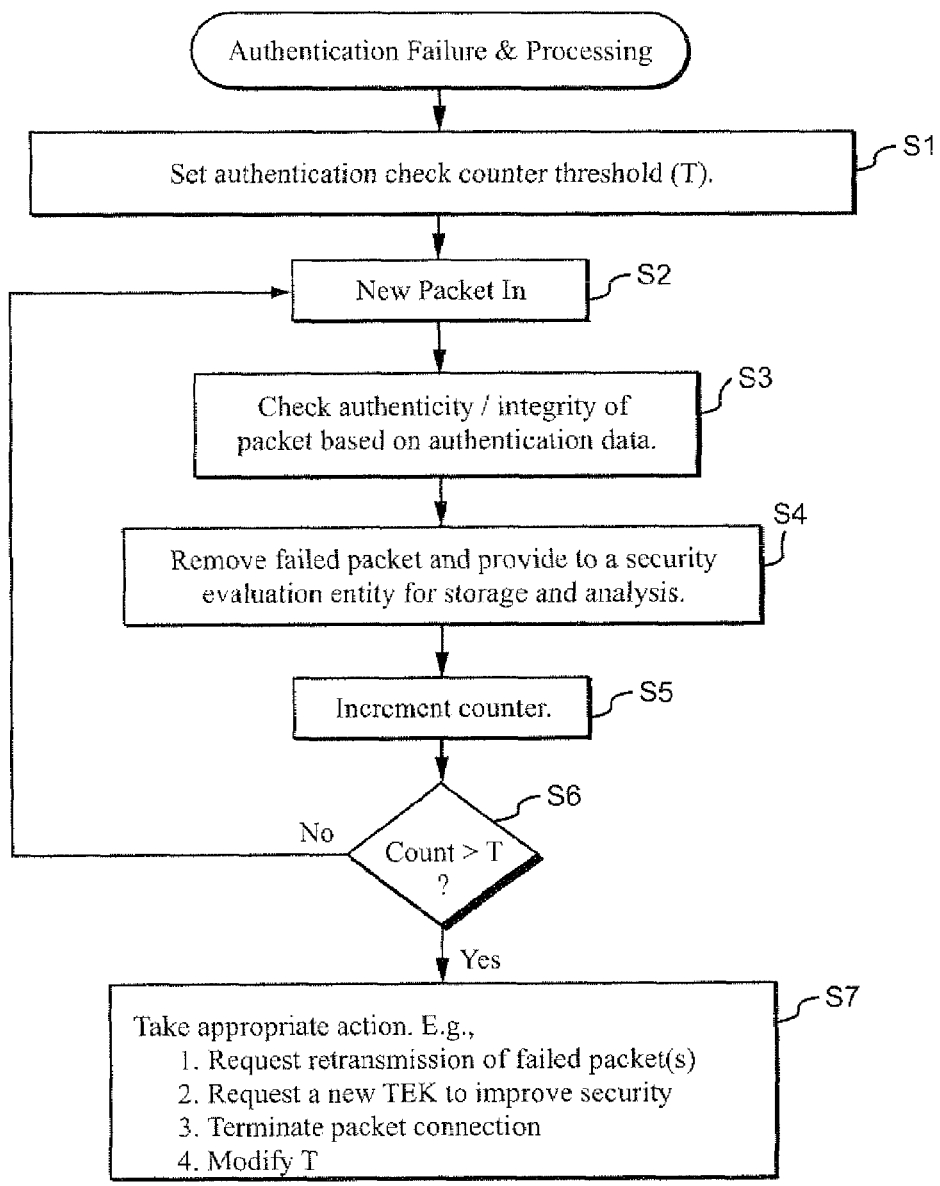
FIG. 4 is a flow chart illustrating non-limiting example procedures that may be performed by a base station and/or a mobile radio relating to integrity checking and analysis.

FIG. 4 is a flow chart diagram entitled "Authenticity Failure and Processing" illustrating non-limiting example procedures that may be performed by a base station and/or a mobile radio relating to integrity/authenticity checking and analysis. In step S1, an authentication check counter threshold (T) is either set or determined. A new packet is received (step S2), and the authenticity or integrity of a packet is checked based upon authentication data appended to that packet (step S3). If the check results in a failure, i.e., the packet is determined to be inauthentic, the failed packet is removed from the communication and provided to a security evaluation entity for storage and analysis (step S4). The authentication check counter is incremented (step S5), and a decision is made in step S6 whether the count value exceeds the threshold. If not, the authenticity of a subsequent packet for the communication between the mobile and base station is checked at step S2. However, if the count equals or exceeds the threshold, an appropriate action is taken (step S7). Non-limiting examples of appropriate actions include (1) request retransmission of one or more failed packets, (2) request a new traffic encryption key (TEK) to improve the security of the packets to be communicated in the future for this communication, (3) terminate the packet communication/connection, and (4) modify the authentication check counter threshold. Regarding action (1), it may be appropriate to request retransmission of failed packets if, for example, those packets are determined to not represent a security breach but rather were simply corrupted by radio conditions. For action (2), a new TEK key may be requested and used to encrypt the payload of a packet if a security breach is suspected for the communication using the old TEK. If the likelihood of restoring a security breach is sufficiently serious, then this may warrant simply terminating the packet connection (action (3)). Regarding action (4), the initial threshold may be set to 0. If the count is greater than or equal to 0, the action can be a request to retransmit the packet. The threshold may then be set to one or more predetermined higher values, and if the count is greater than or equal to a predetermined higher value, action 2 (a new TEK request) or 3 (drop the connection) may be triggered.

The different or adjusted thresholds are used to detect the basis for the failed authentications. Preferably, the retransmission action on packets that initially fail the authenticity check is performed until a retransmission threshold value is reached. At that point, though, there is a concern that a security breach has occurred, and another more serious action is taken for further authentication failures, such as requesting a new TEK or dropping the connection. The retransmission action is used to determine if a packet failed the authentication check because of poor radio channel conditions or because of a security breach. Consistent authentication failures on a retransmitted packet suggests the packet authentication failures have not been because of radio channel conditions, but rather as a result of potential security reasons.

Figure 5:
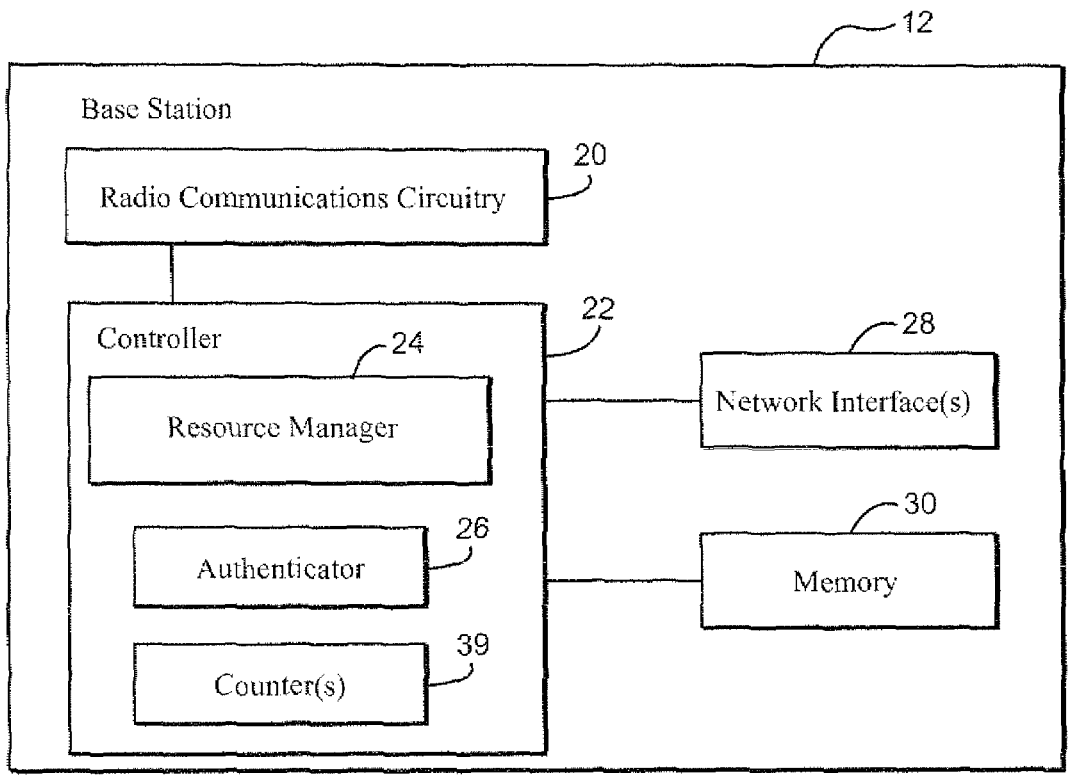
FIG. 5 is a non-limiting function block diagram of a base station.

FIG. 5 is a non-limiting function block diagram of a base station 12 for implementing the authentication processing illustrated in FIG. 4. The base station 12 includes radio communications circuitry 20 coupled to a controller 22. The controller 22 is also coupled to a memory 30 and one or more interfaces 28 for communication with radio access and/or other networks. The controller 22 includes, among other things, a resource manager 24 that may be used for a variety of resource management tasks such as scheduling transmission, grants, etc., and an authenticator 26 for performing a variety of security-related functions including those just described in conjunction with FIG. 4. One or more counters 39 are provided for use in authentication checking.

Figure 6:
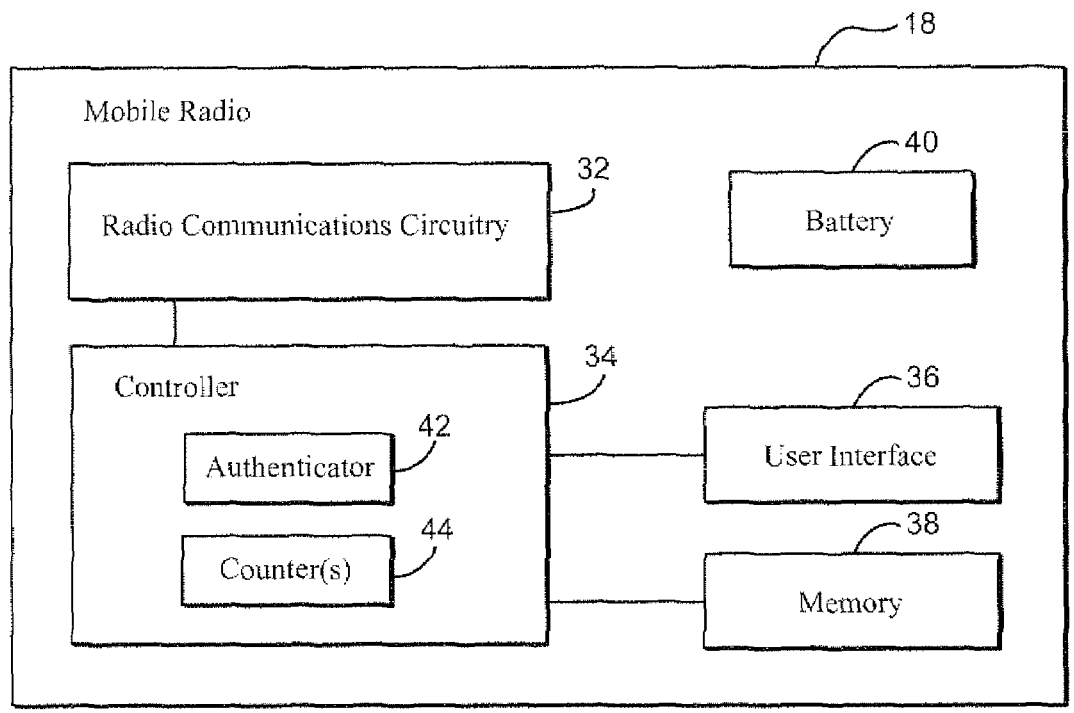
FIG. 6 is a non-limiting function block diagram of a mobile radio station.

The same authentication procedures may be implemented in the mobile radio. FIG. 6 is non-limiting function block diagram of a mobile radio station 18. Radio communications circuitry 32 is provided and coupled to a controller 34. The controller 34 is coupled to a user interface 36 (e.g., a speaker, microphone, keypad, touch pad, display, etc.) for communications with the user. The controller 34 is also coupled to a memory 38 and includes an authenticator 42 and one or more counters 44 for use in the authentication/integrity checking, analysis, and management. Battery 40 powers the radio communication circuitry 32, the controller 34, the user interface 36, and the memory 38.

Figure 7:
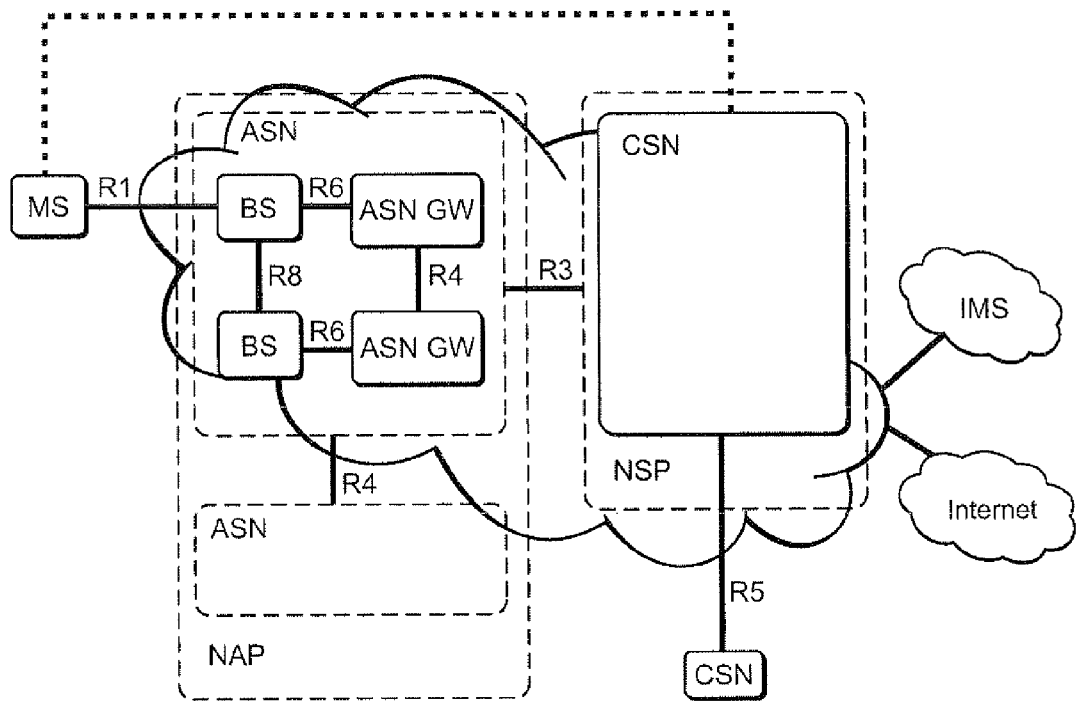
FIG. 7 is a non-limiting function block diagram of an 802.16 type of cellular communications system.

A specific but non-limiting example application is to an 802.16 type of cellular communications system, commonly referred to as a WiMAX type of system. FIG. 7 is non-limiting function block diagram of an 802.16 type of cellular communications system. A non-limiting example embodiment is presented in this context, but the enhanced cell scanning technology described may be applied to any modern cellular system. A mobile station (MS) is connected over an air interface R1 to a base station (BS) included in an access service network (ASN). The ASN may include multiple base stations which may communicate over an R8 interface. Each base station also communicates with an ASN gateway (ASN GW) over an R6 interface. The ASN GW's may communicate over an R4 interface. Multiple access service networks also communicate over an interface R4 and are collectively included in a network access point (NAP). The ASN communicates with a connectivity service network (CSN) over an interface R3. The CSN is part of a network service provider (NSP). Different connectivity service providers may communicate over an interface R5 and/or with an IP multimedia system (IMS) and/or the Internet. Again, although this non-limiting example is used for purposes of illustration in the description below, and the technology in this application may be applied to other modern cellular systems such as second generation (2G) and third generation (3G) cellular systems.

Figure 8:
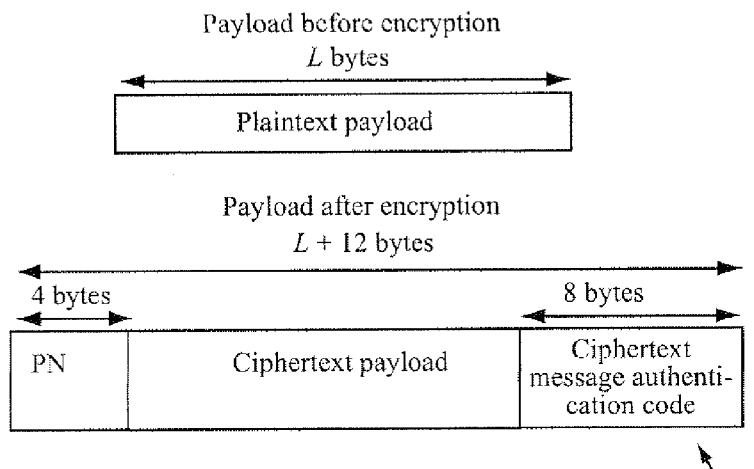
FIG. 8 is a diagram showing a packet before and after encryption in the 802.16 system shown in FIG. 7.

FIG. 8 is a diagram showing a packet before and after security processing in the 802.16 system shown in FIG. 7. A data payload of L-bytes before encryption is shown at the top of the figure as "plaintext payload." As part of security processing in the security sub-layer in preparation for transmission from a mobile station or a base station, the plaintext payload is encrypted using a transmission encryption key (TEK) to form a ciphertext payload. Different encryption algorithms can be used such as DES-CV, AES-CCM, as well as other cryptographic suites. Prepended to the ciphertext payload is a 4-byte packet number (PN) and appended to the ciphertext payload is an 8-byte ciphertext message authentication code referred to as a cipher text integrity check value (ICV). The ICV value is checked by the authenticator in either the base station or the mobile station to determine whether that packet is authentic. The payload of the packet after encryption is then L+12 bytes.

Figure 9:
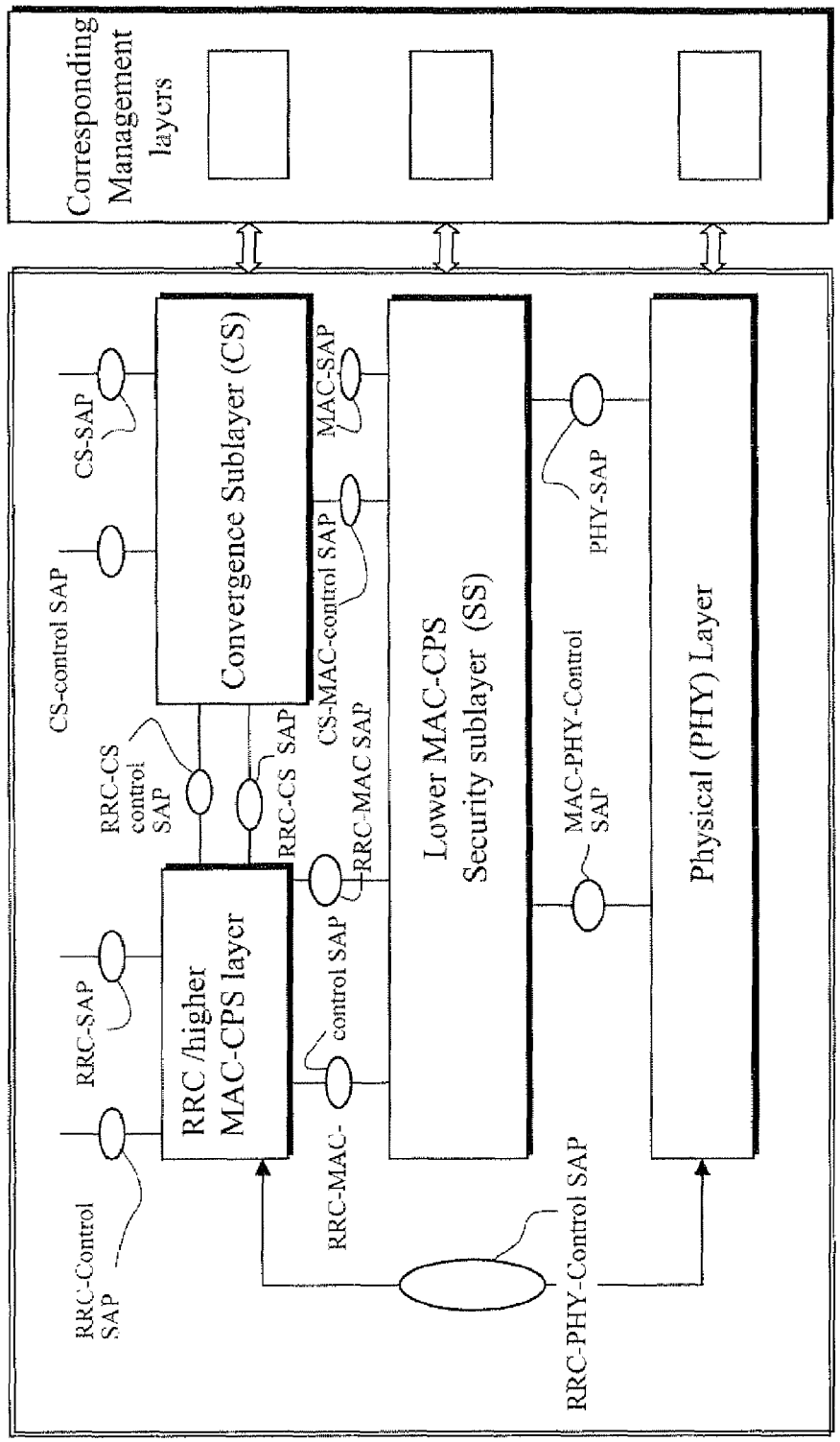
FIG. 9 is diagram illustrating a non-limiting example of lower protocol layers for use in the security monitoring and management of the 802.16 system.

FIG. 9 is a diagram illustrating a non-limiting example of lower protocol layers for use in security monitoring and management of the 802.16 system shown in FIG. 7. In addition to the physical (PHY) layer at the bottom of the protocol stack, a new lower medium access control (MAC)-common part sublayer (CPS) is configured as the security sublayer (SS). It is at this layer that the procedures, such as those outlined in FIG. 4 above and in FIG. 10 below, are preferably performed in an example embodiment directed to 802.16. The lower MAC-CPS security sublayer communicates with the physical layer via control and data service access points (SAPs). Above the lower MAC-CPS security sublayer is a radio resource control/management (RRCM) higher MAC-CPS layer for connection setup/release, connection management, etc. and a convergence sublayer (CS) which is a service specific layer that terminates various transport layers such as ATM and IP layers and provides conversion for the radio layer. It also provides header compression and QoS classification of service data units (SDUs). Various layers communicate control messages and data over corresponding service access points. In addition, there are corresponding management protocol layers for each of the physical layer, lower MAC-CPS security sublayer, RRC/higer MAC-CPS layer, and convergence sublayer that provides operational and management support.

Figure 10:
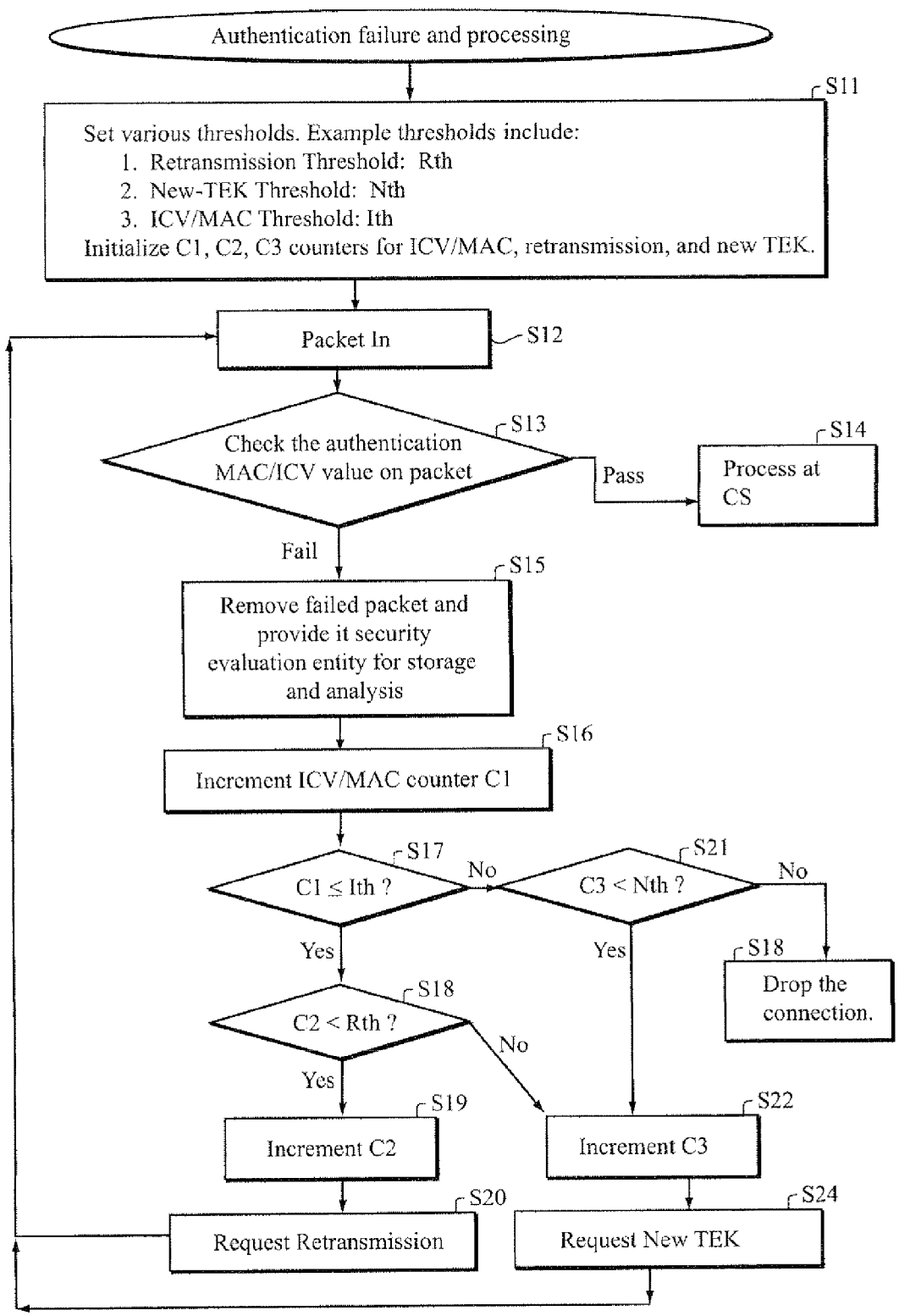
FIG. 10 is a flow chart illustrating non-limiting example procedures that may be performed by a base station and/or a mobile radio in an 802.16 type system relating to packet authentication checking and analysis.

FIG. 10 is a flow chart diagram entitled "Authentication Failure and Processing" illustrating non-limiting example procedures that may be performed by a base station and or a mobile station in an 802.16 type system. Initially, various thresholds are set that relate to the authentication failure and processing (step S11). Example thresholds include a retransmission threshold $R_{th}$, a new-TEK threshold $N_{th}$, and an ICV/MAC threshold $I_{th}$. A corresponding counter is initialized for each one of these thresholds. Counter C1 corresponds to the ICV/MAC threshold; counter C2 corresponds to the retransmission threshold, and counter C3 corresponds to the new-TEK threshold.

After the initial threshold settings and counter initialization, a packet is received for processing (step S12), and the authentication ICV/MAC value for that packet is checked (step S13). If the packet passes the authentication check, then it is processed and passed on to the convergence sublayer (step S14). If the packet fails the authentication check, then the failed packet is removed (but not discarded) and provided to a security evaluation entity for storage and analysis (step S15). The security evaluation entity may be located in the base station and/or mobile station in which the packet is being processed, or it may be a security evaluation entity located on another node. The ICV counter C1 is incremented (step S16), and a decision is made (step S17) whether the counter value C1 is less than or equal to the ICV threshold $I_{th}$. If so, then another decision is made in step S18 whether the count value exceeds the retransmission threshold $R_{th}$. If it does, then the counter C2 is incremented (step S19), and retransmission is requested of that failed packet (step S20). As explained above, these different thresholds are used to detect the basis for the failed authentications. Preferably, the retransmission action on packets that initially fail the authenticity check is performed until the ICY threshold value is reached. At that point, there is a concern that a security breach has occurred, and another more serious action is taken for further authentication failures, such as requesting a new TEK or dropping the connection as described above based on the other two threshold comparisons. The retransmission action is thus used to determine if a packet failed the authentication check because of poor radio channel conditions or because of a security breach. Consistent authentication failures on a retransmitted packet suggests the packet authentication failures have not been because of radio channel conditions, but rather as a result of potential security reasons. After making the request, control returns to process the next packet in step S12.

Returning to the decision in step S17, if the IVC threshold is exceeded, then a decision is made in step S21 whether the count value in counter C3 is less than the new-TEK threshold $N_{th}$. If it is not, the communication/connection is dropped (step S12) because a genuine security breach is determined to likely have occurred. Otherwise, counter C3 corresponding to the new-TEK threshold is incremented in step S22. The count value C3 is also incremented when the count value C2 exceeds the retransmission threshold $R_{th}$ in block S18. After the counter C3 is incremented, a new-traffic encryption key (TEK) is requested by an authentication entity either in the base station (BS) or the mobile station (MS) depending upon where (at the BS or MS) the non-authentic packets are detected in step S24, and the next packet is processed. A new TEK is requested to see if the problem of non-authentic packets can be resolved with new encryption key.

Figure 11A:
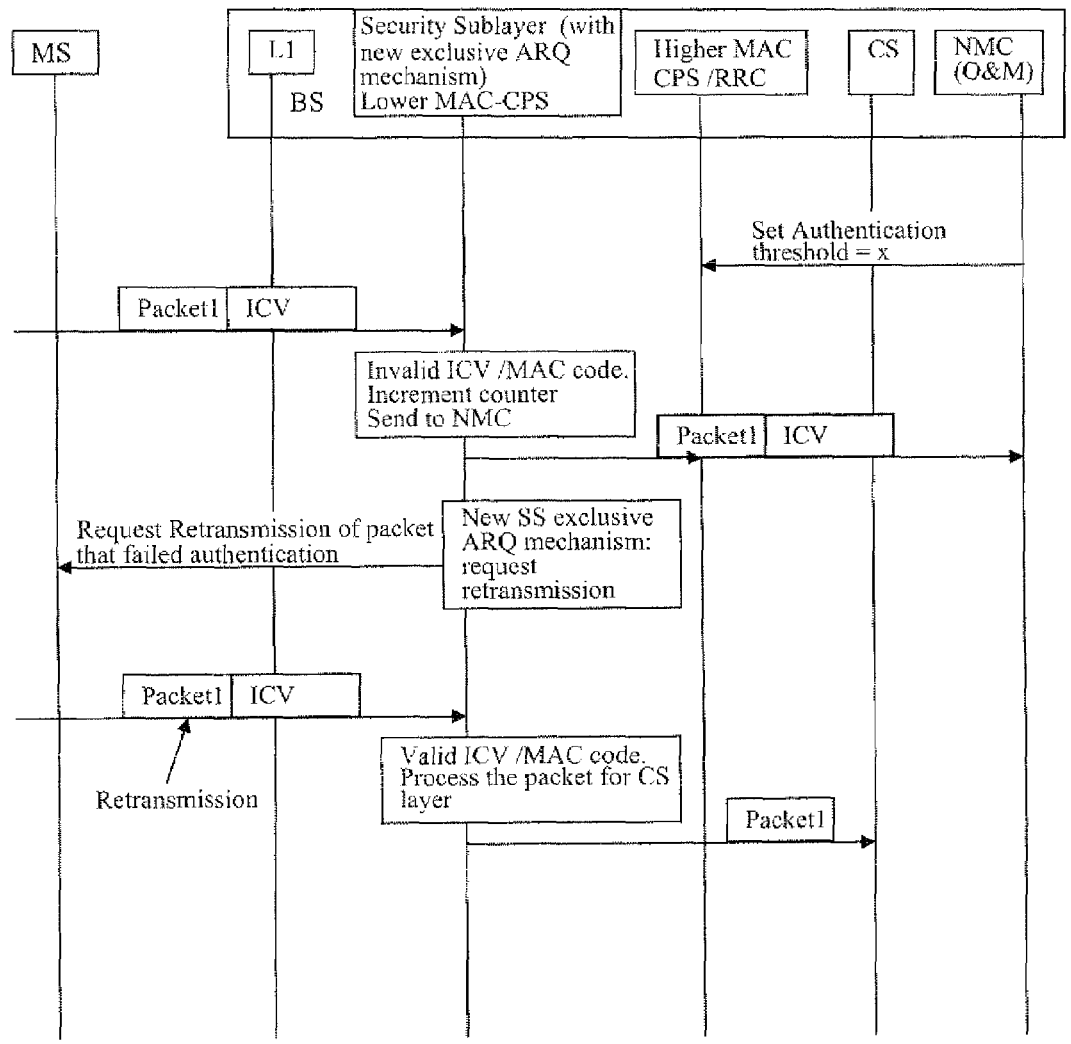
FIGS. 11A-11E are non-limiting example signaling diagrams illustrating the detecting and processing of packets that fail authenticity/integrity checking in the non-limiting example 802.16 system shown in FIG. 7 along with various example packet retransmission procedures.

FIGS. 11A-11E are non-limiting example signaling diagrams illustrating various approaches for detecting and processing a packet that fails authenticity/integrity checking in the non-limiting example 802.16 system shown in FIG. 7. In FIG. 11A, the packet is received from the mobile station MS and processed in the base station 12. Initially, the base station receives the packet with its appended ICV at the physical layer L1. The lower MAC-CPS security sublayer in the authenticator 26 determines that the packet's IVC/MAC code is invalid which means that the packet is not authenticated. Although the packet is dropped from the communication, meaning it is not further processed by higher layers in the protocol stack, it is not discarded. Instead, the failed packet is provided to a network management control (NMC) entity or other operation and maintenance (O&M) entity for storage and analysis. In this non-limiting example, the NMC is part of the base station protocol stack and can be part of the authenticator 26. However, other implementations and/or locations are possible for the storage and processing.

The NMC sets the authentication threshold to a value X and establishes that failed packet retransmission should occur if the threshold is exceeded. In this example, it is assumed that failed packet 1 being sent to the NMC triggers an ARQ mechanism provided in the security sublayer (SS) to request transmission of the failed packet. The packet 1 is then retransmitted by the mobile station and processed, this time with a valid ICV/MAC code, indicating that the packet is authentic. Packet 1 is then provided to the convergence sublayer (CS) layer for further processing. The NMC preferably stores the failed packet with a corresponding identifier for further analysis. In addition, the ICV count value C1 and any other counter all counter values related to the authenticity checking process are stored for the user connection for analysis by the operator and possible action based on the analysis. The higher MAC-CPS/RRC layer in the authenticator 26 compares the provided ICV count value with its threshold value. If the count value equals or exceeds the threshold value, then one or more appropriate actions is taken including requesting retransmission of the failed packet, requesting a new-TEK, terminating the connection, or resetting the counter threshold. Note: the higher MAC and NMC are two different entities. The higher MAC deals with connection control such as requesting a new TEK, dropping a connection, etc. The NMC sets different threshold values for a user connection depending upon the user's service subscription.

Figure 11B:
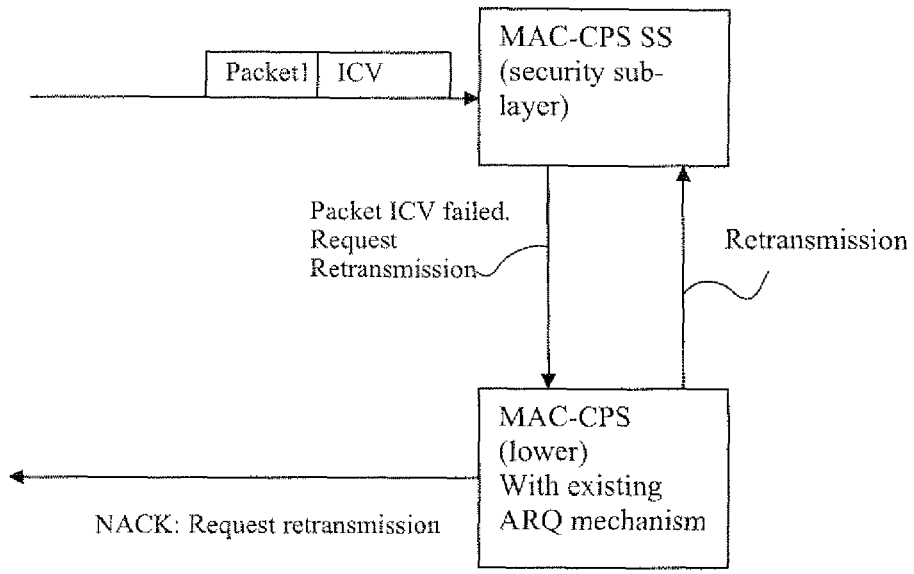

FIG. 11B shows the intra-layer interaction between the lower MAC-CPS security sublayer and the lower MAC-CPS layer. Here, the MAC-CPS security sublayer detects that packet 1's ICV value fails the authenticity test and requests retransmission of the packet 1. The lower MAC-CPS layer has an existing ARQ mechanism in WiMAX and sends a retransmission request for packet No. 1 to the mobile radio. Compared to the example in FIG. 11A, which has an exclusive mechanism for SS purposes, the example embodiment in FIG. 11B uses an existing ARQ mechanism.

Figure 11C:
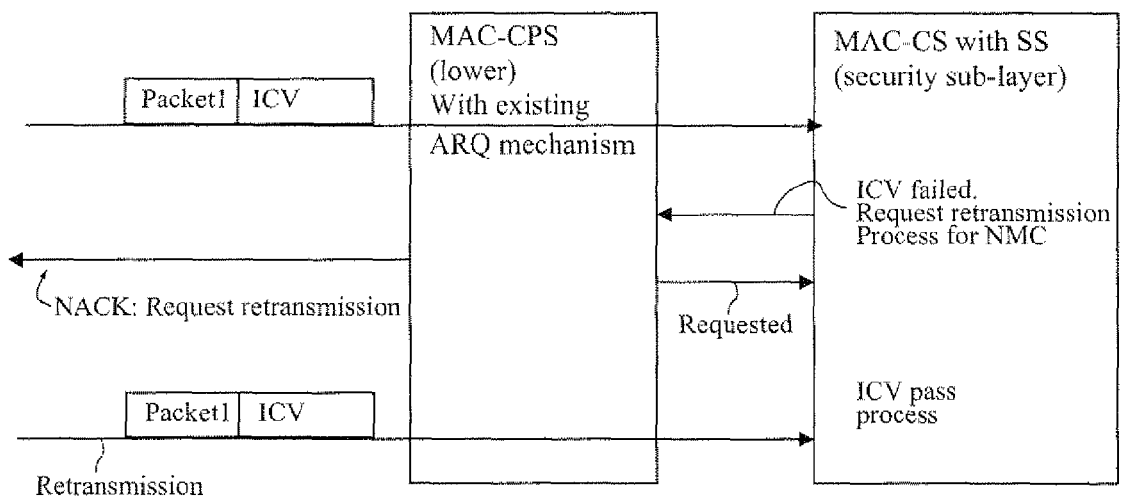

FIG. 11C shows another example retransmission embodiment between the lower MAC-CPS layer with an existing ARQ mechanism and the MAC-CPS with the security sublayer. The lower MAC-CPS layer detects that packet 1 fails the authenticity test and requests retransmission of the packet from the lower MAC-CPS's existing ARQ mechanism, which then makes the request to the mobile station to re-transmit packet 1. In this example embodiment, the SS layer is in the CS layer as compared to that in FIG. 11B where the SS layer is in the MAC CPS layer.

Figure 11D:
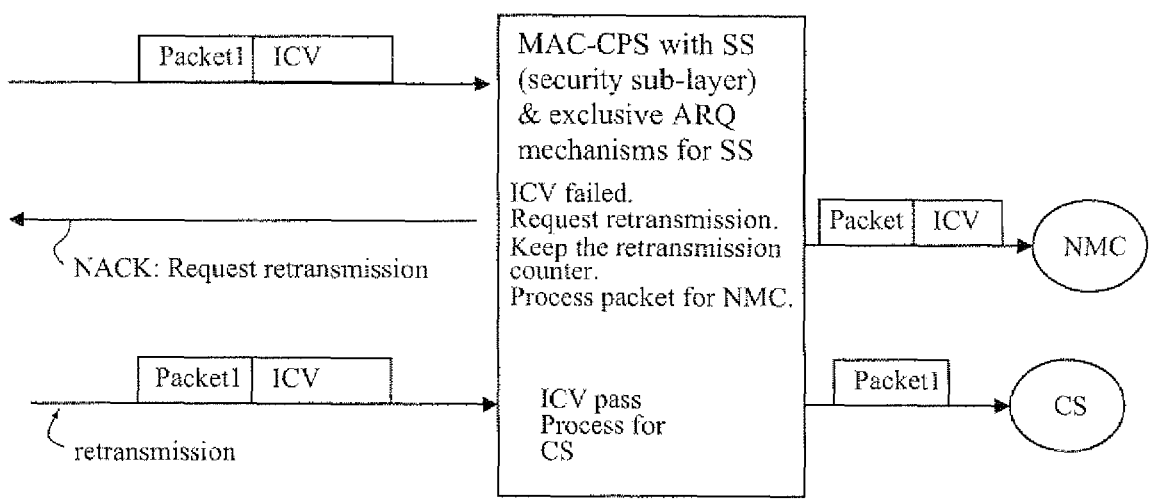

FIG. 11D shows another example retransmission embodiment in which there is an exclusive ARQ mechanism provided at the security sublayer. In this example, the SS determines when the packet 1 fails the authenticity test, sends the failed packet onto the NMC for storage and further analysis and sends a request for retransmission to the mobile station. Storing packets at the NMC allows the network operator to study the radio link quality along with security threats and to take future actions in accordance with that study. As a result, a security threat can often be prevented at earlier stage with appropriate alarms being generated along with improved user connection quality.

Figure 11E:
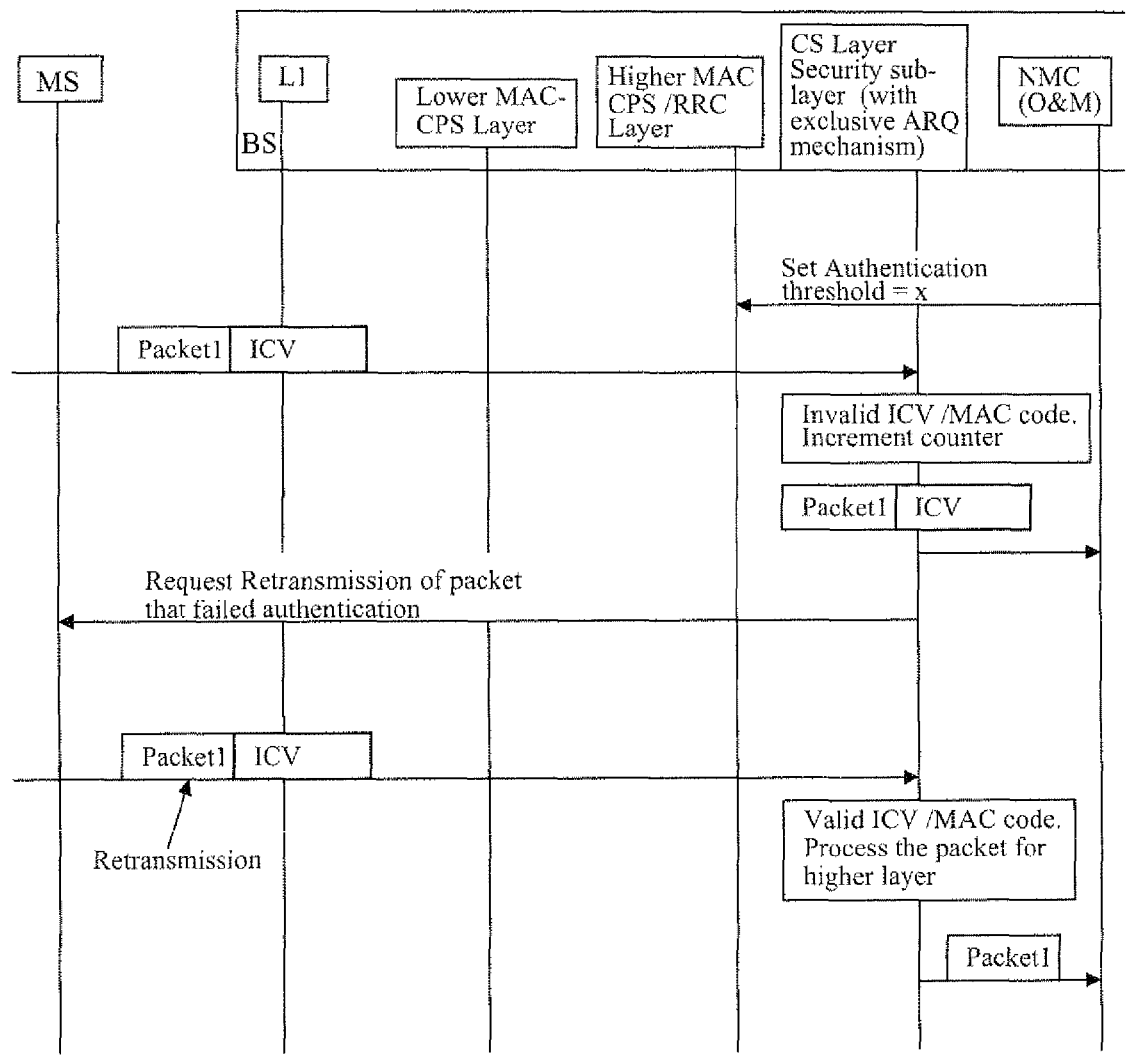

FIG. 11E shows yet another embodiment for retransmission when the security sublayer for data is located at the convergence sublayer (CS). In this example, the ARQ mechanism in the security sublayer requests retransmission of the failed from the mobile station and sends the packet on to the NMC for storage and further processing.

Figure 12:
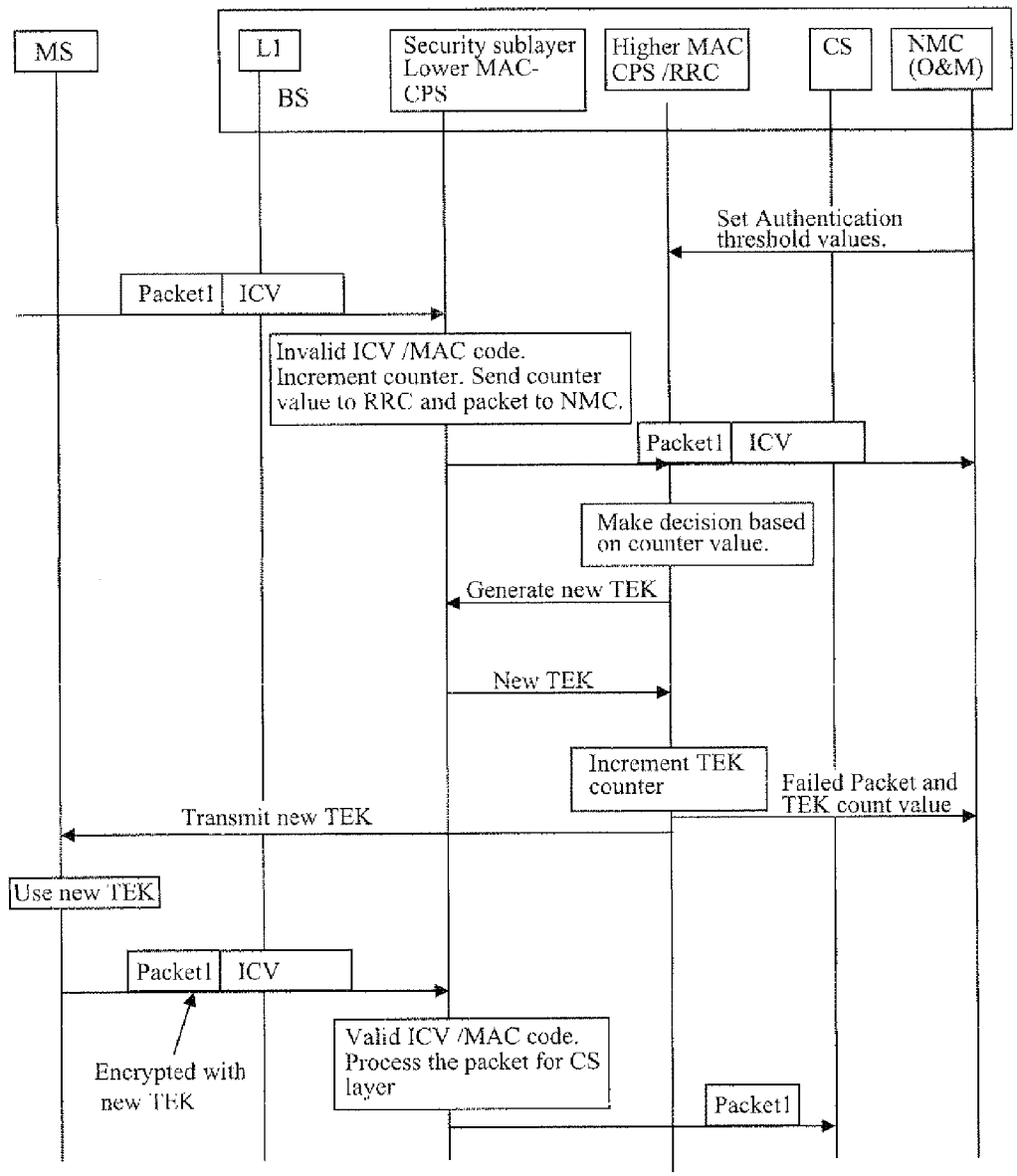
FIG. 12 is a non-limiting example signaling diagram illustrating a TEK request procedure in such an 802.16 system.

FIG. 12 is a non-limiting example signaling diagram illustrating a transmission encryption key (TEK) request procedure in an 802-16 system. In this example, the security sublayer in the lower MAC-CPS detects an invalid ICV code and increments the failed authentication counter C1. The failed packet is sent on to the NMC for further processing via the higher MAC-CPS/RRC layer. Based on one or more positive threshold comparisons, the higher MAC-CPS/RRC layer in this example may also generate a request message asking the security sublayer to generate a new-TEK for the communication between the mobile and the base station. In response to the request, the security sublayer in the lower MAC-CPS generates that new-TEK and sends it to the higher MAC-CPS/RRC layer. The higher MAC-CPS layer increments the TEK counter and sends the count value to the NMC for analysis along with the failed packet. The higher MAC layer also sends a message to the mobile station to transmit a new TEK back to the base station. The mobile station then uses the new TEK to encrypt the same packet 1 encrypted with the new-TEK. The security sublayer receives the newly-encrypted and retransmitted packet and detects a valid IVC/MAC code. Accordingly, this authenticated packet can be processed by the convergence sublayer (CS) as shown.

Figure 13:
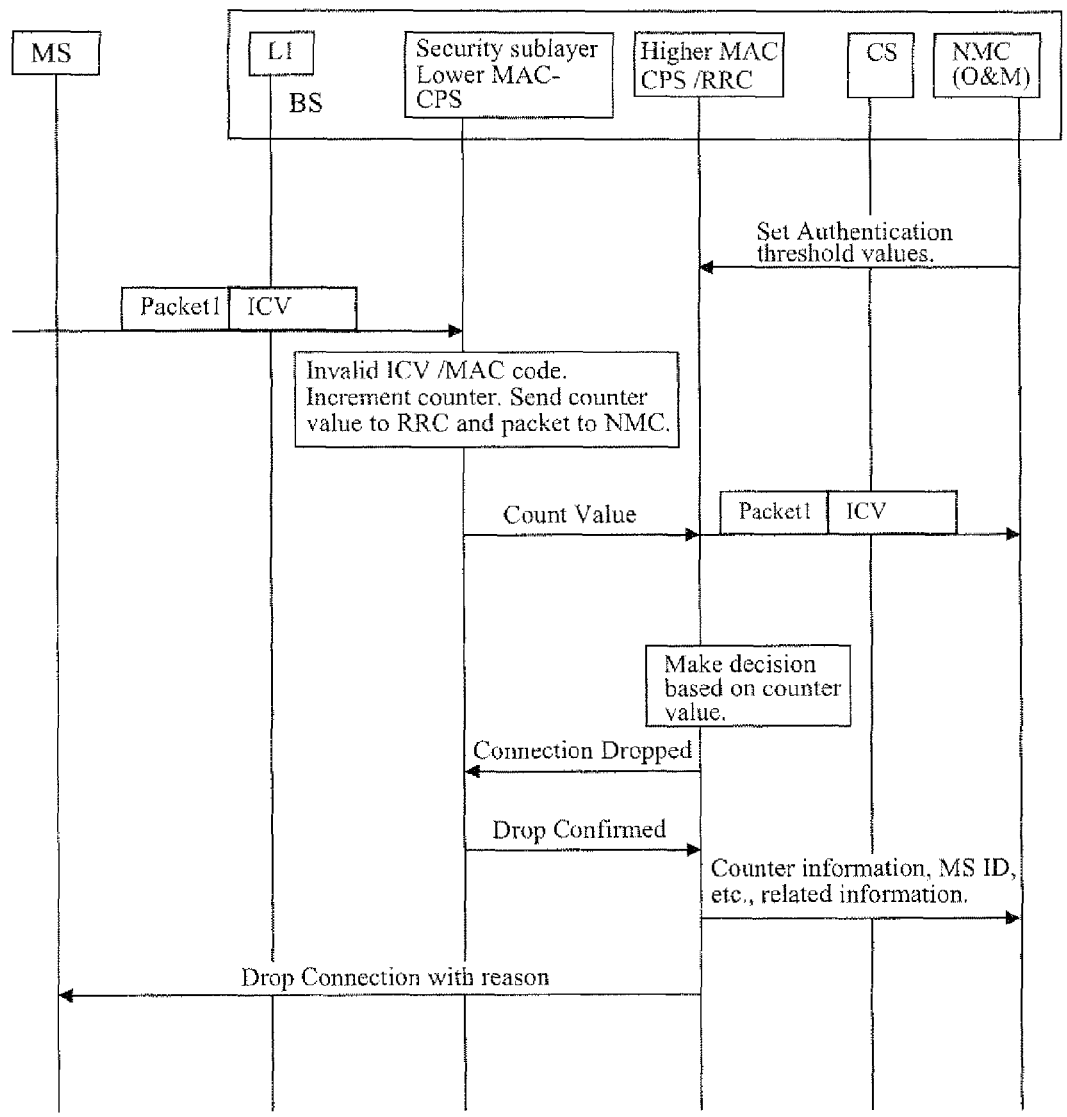
FIG. 13 is a non-limiting example signaling diagram in an 802.16 system for dropping a connection because of a possible security issue.

FIG. 13 is a non-limiting example signaling diagram in an 802.16 system for dropping a connection because of a possible security issue for the communication between the mobile station and the base station. The security sublayer in the lower MAC-CPS detects an invalid IVC appended to packet 1 and increments the IVC counter. The security sublayer in the lower MAC-CPS sends the failed packet onto the NMC for storage and further analysis. The higher MAC-CPS/RRC protocol layer, which earlier received an authentication threshold, detects the count value provided by the security sublayer in the lower MAC-CPS and determines that they are the same. When that threshold is reached, a security breach for the communication is assumed. As a result, the higher MAC CPS/RRC layer determines that the communication should be dropped. Accordingly, the higher MAC layer preferably sends a "drop the connection" message to the mobile station along with a reason explaining why the connection should be dropped. The reason may be useful to inform the mobile station and its user of a possible security breach. The higher MAC-CPS/RRC layer also communicates the counter values to the NMC.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for monitoring a packet-based communication between a mobile radio and a base station in a radio communication system conducted over a radio channel, the method comprising:

testing an authenticity of a packet based on authentication data associated with the packet;

removing packets carrying either data traffic or control/management messages that fail the authenticity test from the communication, wherein rather than immediately discarding the removed packets, the removed packets are stored for future processing;

estimating whether the failed authenticity test was due to a poor radio channel condition on the radio channel based on a failed packet threshold comparison;

determining that a security condition has occurred when a number of failed packets for the communication exceeds a security threshold; and taking action to correct or reduce the security condition, wherein the action includes requesting retransmission of one or more failed packets when the failed authenticity test was estimated to be due to a poor radio channel condition on the radio channel.

2. The method in claim 1 implemented in the base station, in the mobile radio, or both.

3. The method in claim 1, further comprising:
using an existing ARQ mechanism to request retransmission of one or more packets that failed the authenticity test.

4. The method in claim 1, wherein the radio communication system is based on an IEEE 802.16 standard and the authentication data is an integrity check value (ICV) appended to the packet, and the method further comprises:
using an ARQ mechanism located at a security sub-layer within a communications protocol stack used in the radio communication system to request retransmission of one or more packets that failed the authenticity test.

5. The method in claim 1, wherein the radio communication system is based on an IEEE 802.16 standard and the authentication data is an integrity check value (ICV) appended to the packet, and the method further comprises:
using an ARQ mechanism located at a lower medium access control (MAC)-common part sublayer (CPS) to request retransmission of one or more packets that failed the authenticity test.

6. The method in claim 1, wherein the radio communication system is based on an IEEE 802.16 standard and the authentication data is an integrity check value (ICV) appended to the packet, and the method further comprises:
using an ARQ mechanism located at a convergence sub-layer (CS) to request retransmission of one or more data packets that failed the authenticity test.

7. The method in claim 1, wherein the action includes requesting new encryption key.

8. The method in claim 1, wherein the action includes terminating the communication.

9. The method in claim 1, wherein the action includes modifying the security threshold.

10. The method in claim 1, further comprising:
including an indicator in a message associated with the action taken to indicate that action taken is due to occurrence of the security condition.

11. The method in claim 1, further comprising:
sending the removed packets to a communications network managing entity which stores the removed packets, analyzes the stored packets, and determines whether a security breach exists based on the analysis.

12. The method in claim 1, further comprising:
setting multiple authentication-related thresholds for the communication;
establishing a corresponding count value for each authentication-related threshold for the communication;
incrementing one or more of the count values when a packet fails the authenticity test; and
detecting the security condition when multiple count values exceed their corresponding authentication-related thresholds.

13. The method in claim 12, wherein:
the radio communication system is based on an IEEE 802.16 standard and is assigned one or more traffic encryption keys (TEKs),
the authentication data is an integrity check value (ICV) appended to the packet,
the multiple authentication-related thresholds include an ICV threshold, a packet retransmission threshold related to requesting retransmission of one or more failed packets, and a new traffic encryption key (TEK) threshold related to requesting one or more new TEKs for the communication.

14. Apparatus for monitoring a packet-based communication between a mobile radio and a base station in a radio communication system conducted over a radio channel, the apparatus comprising electronic circuitry configured to:
test an authenticity of a packet based on authentication data associated with the packet;
remove packets that fail the authenticity test from the communication, instead of immediately discarding the removed packets, and store the removed packets for future processing;
estimate whether the failed authenticity test was due to a poor radio channel condition on the radio channel based on a failed packet threshold comparison;
determine that a security condition has occurred when a number of failed packets for the communication exceeds a security threshold; and
take action to correct or reduce the security condition wherein the action includes requesting retransmission of one or more failed packets when the failed authenticity test was estimated to be due to a poor radio channel condition on the radio channel.

15. The apparatus in claim 14 implemented in the base station, in the mobile radio, or both.

16. The apparatus in claim 14, wherein the electronic circuitry is further configured to:
use an existing ARQ mechanism to request retransmission of one or more packets that failed the authenticity test.

17. The apparatus in claim 14, wherein the radio communication system is based on an IEEE 802.16 standard and the authentication data is an integrity check value (ICV) appended to the packet, and wherein the electronic circuitry is further configured to:
use an ARQ mechanism located at a security sub-layer within a communications protocol stack used in the radio communication system to request retransmission of one or more packets that failed the authenticity test.

18. The apparatus in claim 14, wherein the radio communication system is based on an IEEE 802.16 standard and the authentication data is an integrity check value (ICV) appended to the packet, and wherein the electronic circuitry is further configured to:
use an ARQ mechanism located at a lower medium access control (MAC)-common part sublayer (CPS) to request retransmission of one or more packets that failed the authenticity test.

19. The apparatus in claim 14, wherein the radio communication system is based on an IEEE 802.16 standard and the authentication data is an integrity check value (ICV) appended to the packet, and wherein the electronic circuitry is further configured to:
use an ARQ mechanism located at a convergence sublayer (CS) to request retransmission of one or more data packets that failed the authenticity test.

20. The apparatus in claim 14, wherein the action includes one or more of the following: requesting retransmission of failed packets, requesting new authentication data for the communication including a new encryption key, terminating the communication, and modifying the security threshold.

21. The apparatus in claim 14, wherein the electronic circuitry is further configured to:
include an indicator in a message associated with the action taken to indicate that action taken is due to occurrence of the security condition.

22. The apparatus in claim 14, wherein the electronic circuitry is further configured to:
send the removed packets to a communications network managing entity which stores the removed packets, analyzes the stored packets, and determines whether a security breach exists based on the analysis.

23. The apparatus in claim 22, wherein the communications network managing entity is located in the base station.

24. The apparatus in claim 14, wherein the electronic circuitry is further configured to:
set multiple authentication-related thresholds for the communication;
establish a corresponding count value for each authentication-related threshold for the communication;
increment one or more of the count values when a packet fails the authenticity test; and
detect the security condition when multiple count values exceed their corresponding authentication-related thresholds.

25. The apparatus in claim 24, wherein:
the radio communication system is based on an IEEE 802.16 standard and is assigned one or more traffic encryption keys (TEKs),
the authentication data is an integrity check value (ICV) appended to the packet,
the multiple authentication-related thresholds include an ICV threshold, a packet retransmission threshold related to requesting retransmission of one or more failed packets, and a new traffic encryption key (TEK) threshold related to requesting one or more new TEKs for the communication.

26. Apparatus for use in a packet-based communication between a mobile radio and a base station in a radio communication system conducted over a radio channel, the apparatus comprising:
means for testing an authenticity of a packet based on authentication data associated with the packet;
means for removing packets that fail the authenticity test from the communication instead of immediately discarding the removed packets and for storing the removed packets for future processing;
means for estimating whether the failed authenticity test was due to a poor radio channel condition on the radio channel based on a failed packet threshold comparison;
means for determining that a security condition has occurred when a number of failed packets for the communication exceeds a security threshold; and
means for taking action to correct or reduce the security condition, wherein the action includes requesting retransmission of one or more failed packets when the failed authenticity test was estimated to be due to a poor radio channel condition on the radio channel.

27. The apparatus in claim 26, wherein the removed packets are not discarded.

28. The apparatus in claim 26, further comprising:
means for using an existing ARQ mechanism to request retransmission of one or more packets that failed the authenticity test.

29. The apparatus in claim 26, wherein the radio communication system is based on an IEEE 802.16 standard and the authentication data is an integrity check value (ICV) appended to the packet, and the apparatus further comprises:
means for using an ARQ mechanism located at a security sub-layer within a communications protocol stack used in the radio communication system to request retransmission of one or more packets that failed the authenticity test.

30. The apparatus in claim 26, wherein the radio communication system is based on an IEEE 802.16 standard and the authentication data is an integrity check value (ICV) appended to the packet, and the apparatus further comprises:
means for using an ARQ mechanism located at a lower medium access control (MAC)-common part sublayer (CPS) to request retransmission of one or more packets that failed the authenticity test.

31. The apparatus in claim 26, wherein the radio communication system is based on an IEEE 802.16 standard and the authentication data is an integrity check value (ICV) appended to the packet, and the apparatus further comprises:
means for using an ARQ mechanism located at a convergence sublayer (CS) to request retransmission of one or more data packets that failed the authenticity test.

32. The apparatus in claim 26, wherein the action includes one or more of the following: requesting retransmission of failed packets, requesting new authentication data for the communication including a new encryption key, terminating the communication, and modifying the security threshold.

33. The apparatus in claim 26, further comprising:
means for sending the removed packets to a communications network managing entity which stores the removed packets, analyzes the stored packets, and determines whether a security breach exists based on the analysis.

34. The apparatus in claim 26, further comprising:
means for setting multiple authentication-related thresholds for the communication;
means for establishing a corresponding count value for each authentication-related threshold for the communication;
means for incrementing one or more of the count values when a packet fails the authenticity test; and
means for detecting the security condition when multiple count values exceed their corresponding authentication-related thresholds.

35. The apparatus in claim 34, wherein:
the radio communication system is based on an IEEE 802.16 standard and is assigned one or more traffic encryption keys (TEKs),
the authentication data is an integrity check value (ICV) appended to the packet,
the multiple authentication-related thresholds include an ICV threshold, a packet retransmission threshold related to requesting retransmission of one or more failed packets, and a new traffic encryption key (TEK) threshold related to requesting one or more new TEKs for the communication.

* * * * *

UNITED STATES PATENT AND TRADEMARK OFFICE
CERTIFICATE OF CORRECTION

PATENT NO. : 8,566,929 B2  
APPLICATION NO. : 12/255509  
DATED : October 22, 2013  
INVENTOR(S) : Thakare Page 1 of 1

It is certified that error appears in the above-identified patent and that said Letters Patent is hereby corrected as shown below:

In the Specification

Column 2, Line 60, delete "implemented then" and insert -- implemented, then --, therefor.

Column 7, Line 65, delete "ICY" and insert -- ICV --, therefor.

In the Claims

Column 11, Line 66, in Claim 14, delete "Apparatus" and insert -- An apparatus --, therefor.

Column 13, Line 26, in Claim 26, delete "Apparatus" and insert -- An apparatus --, therefor.

Signed and Sealed this
Sixteenth Day of September, 2014

Michelle K. Lee
*Deputy Director of the United States Patent and Trademark Office*